United States Patent [19]
Fletcher et al.

[11] 3,984,686
[45] Oct. 5, 1976

[54] FOCUSED LASER DOPPLER VELOCIMETER

[76] Inventors: James C. Fletcher, Administrator of the National Aeronautics and Space Administration, with respect to an invention of James W. Bilbro; Werner K. Dahm, both of Huntsville, Ala.; Ronald B. Campbell, Jr., Sudbury, Mass.; Robert M. Huffaker, Huntsville; Harold B. Jeffreys, Decatur, both of Ala.; Albert V. Jelalian, Bedford; Wayne H. Keene, Medfield, both of Mass.; Michael C. Krause; Thomas R. Lawrence, both of Huntsville, Ala.; Charles M. Sonnenschein, Natick, Mass.; David J. Wilson, Huntsville, Ala.; James A. L. Thomson, Berkeley, Calif.

[22] Filed: Dec. 3, 1975

[21] Appl. No.: 637,247

[52] U.S. Cl. .............................. 250/339; 250/338; 250/347; 356/106 R
[51] Int. Cl.² ..................... G01B 9/02; G01N 21/00
[58] Field of Search .......... 250/338, 339, 340, 341, 250/347, 348, 351, 353; 356/106 R

[56] References Cited
UNITED STATES PATENTS

| | | | |
|---|---|---|---|
| 3,634,682 | 1/1972 | Gold | 356/106 R X |
| 3,780,293 | 12/1973 | Flint | 250/339 |
| 3,915,572 | 10/1975 | Orloff | 356/106 R |

Primary Examiner—Archie R. Borchelt
Attorney, Agent, or Firm—L. D. Wofford, Jr.; George J. Porter; John R. Manning

[57] ABSTRACT

A system for remotely measuring velocities present in discrete volumes of air in which a $CO_2$ laser beam is focused by a telescope at such a volume, a focal volume, and within the focusable range, near field, of the telescope. The back scatter, or reflected light, principally from the focal volume, passes back through the telescope and is frequency compared with the original frequency of the laser, and the difference frequency or frequencies represent particle velocities in that focal volume.

10 Claims, 3 Drawing Figures

3,984,686

FOCUSED LASER DOPPLER VELOCIMETER

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

This invention relates to systems for the remote measurement of the velocity and turbulence structure of the atmosphere, and particularly to such a system in which turbulent regions may be located, their profile determined, and their movement tracked.

2. General Description of the Prior Art

In the past, velocity and turbulence measurements of the atmosphere have generally been made by anemometers and various types of radar. Anemometers, of course, are typically fixed positioned and lack sufficient controlled mobility to provide a profile over any significant volume of the atmosphere. Previous radar systems, while capable of being trained to scan in essentially any direction, lacked sufficient resolution.

SUMMARY OF THE INVENTION

In accordance with this invention, a form of optical radar is employed utilizing radiation having a wavelength of 3 to 12 microns. The radiation is focused by a telescope to observe discrete focal volumes of atmosphere at selected ranges and elevations, enabling a much improved signal-to-noise ratio and resolution of reflected and returned signals. The returned signals comprise discrete signals shifted in wavelength by velocities of air movement or turbulence, and these wavelength shifts are detected as doppler shifts by wavelength comparison between signals of the returned radiation and the wavelength or frequency of a reference derived from the laser beam being transmitted. This conversion is achieved by a square law detector which generates electrical signals at the difference or doppler frequencies. These frequencies are identified by frequency filtering and the intensity of selected frequencies measured. The significant differences between the focused heterodyne system described herein and others relate to the dimension of the near field of the antennas. The near field (Fresnel or transitional region) extends to the range at which diffraction has doubled the width of a collimated beam. It is this near focusable field which is utilized by the present system.

The resolving capability of this system is expressed in terms of that range element in space, focal volume, that contributes a specified portion of the total back-scattered signal at various ranges of focus for the system.

The signal-to-noise ratio of the system is given by $$S/N = \frac{\eta P_T \beta(\pi)}{\pi h \nu B} \left(\frac{\lambda}{y}\right)^2 \int_{L_1}^{L_2} \frac{1}{(L-L^*)^2 - (\Delta L)^2} dL$$

where:

$\eta$ = detector quantum efficiency
$P_T$ = transmitter power
$B(\pi)$ = back scatter coefficient
$B$ = system bandwidth
$L$ = particle range $$y = \sqrt{2}\,\frac{R}{f}\,\sqrt{1 + \left(\frac{\lambda f}{\pi R^2}\right)^2}$$

$$L^* = \frac{f}{1 + \left(\frac{\lambda f}{\pi R^2}\right)^2}$$

$$\Delta L = \frac{\lambda f^2}{\pi R^2 \left[1 + \left(\frac{\lambda f}{\pi R^2}\right)^2\right]}$$

and $\nu$ = frequency of transmitted radiation
$R$ = transmitter/receiver aperture radius
$f$ = transmitter/receiver focal length, equivalent to range to focus
$\lambda$ = wavelength of transmitted radiation
$L_2, L_1$ = extent of target aerosol Then, $$S/N = \frac{2 \eta P_T \beta(\pi)}{\pi h \nu B \Delta L} \left(\frac{\lambda}{y}\right)^2 \left[\tan^{-1}\left(\frac{L_2 - L^*}{\Delta L}\right) - \tan^{-1}\left(\frac{L_1 - L^*}{\Delta L}\right)\right]$$

From these:

$$S/N = \frac{\eta P \beta(\pi) \lambda}{2 h \nu B \left[1 + \left(\frac{\lambda f}{\pi R^2}\right)\right]} \left[\tan^{-1}\left(\frac{L_2 - L^*}{\Delta L}\right) - \tan^{-1}\left(\frac{L_1 - L^*}{\Delta L}\right)\right]$$

This equation can be analyzed for range resolution by letting $L_2 = f + L'$
$L_1 = f + L'$ This is equivalent to looking at a region of length 2L centered about the focal point of the lens. Obviously, the maximum realizable value of $L'$ is f.

The resolution of the system can be defined by selecting the length of the interval that produces an arbitrary fraction of the asymptotic value for $L' \rightarrow f$.

DETAILED DESCRIPTION OF THE DRAWINGS

Figure 1:
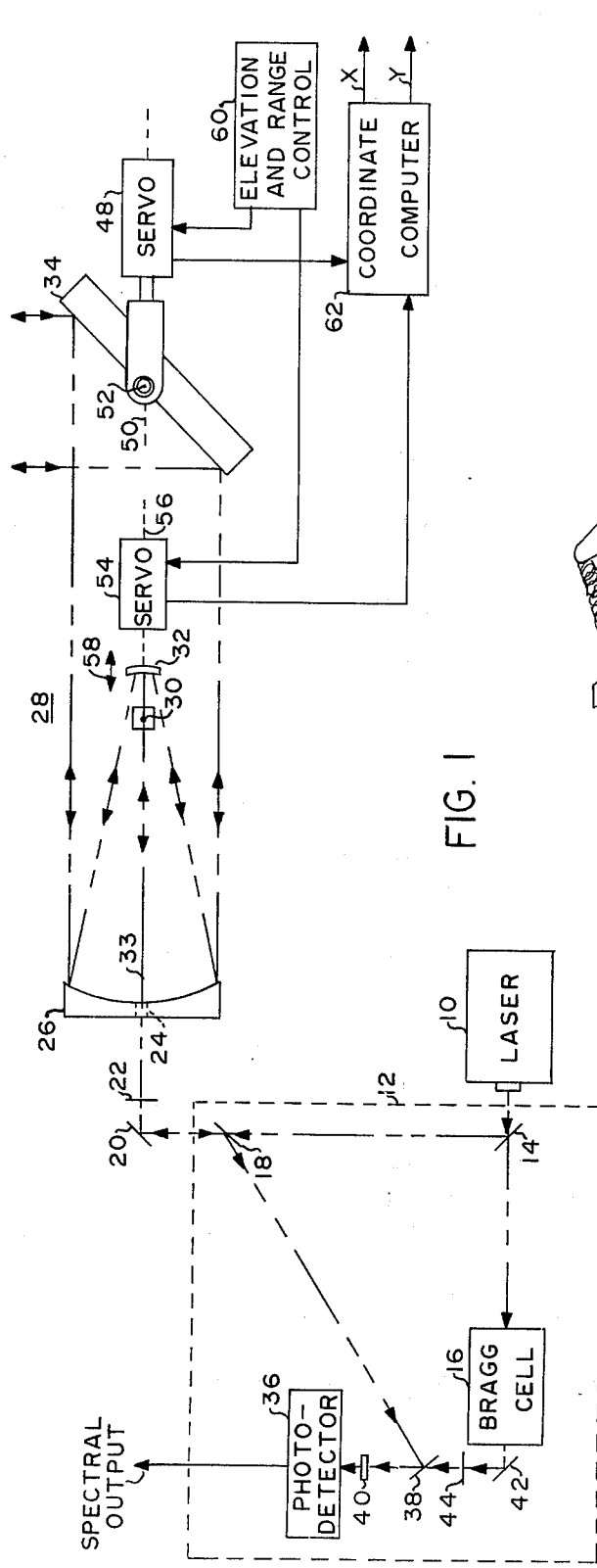
FIG. 1 is a diagrammatic illustration of the optical system of this invention.

Referring to FIG. 1, laser 10 is of the $CO_2$ continuous wave type and produces a beam of horizontally polarized (same plane as sheet of drawing) coherent light of a wavelength of 10.6 microns. Its output is directed to interferometer 12 and onto beam splitter 14, a small portion (10%) of the beam passing through beam splitter 14 to frequency translator, Bragg cell, 16 and the principal portion transmitted through Brewster window 18. The latter passes the horizontally polarized beam (it reflects vertically polarized light) to 45° mirror 20. From mirror 20 the beam is projected through quarter wave plate 22, which changes the polarization from horizontal to right-hand circular. It then passes through a central opening 24 in primary mirror 26 of cassegranian telescope 28 and by a vertical wire 30, functioning as a secondary mirror back scatter attenuator to secondary mirror 32. Secondary mirror 32, approximately 12 millimeters in diameter, expands beam 33, projecting it onto primary mirror 26, which is 12 inches in diameter. Primary mirror 26 then reflects the beam onto scanning mirror 34 from which the beam is directed along a desired directional path into space. Vertical wire 30 is approximately one millimeter in diameter and is positioned to interfere with and significantly block direct reflections from secondary mirror 32 to interferometer 12. Otherwise, a problem would exist since secondary mirror 32 is scanned along the axis of the telescope and the result would be an undesired doppler signal fed to detector 36. Vertical wire 30 does not significantly attenuate reflected signals from space.

The back scatter (reflected portions) of the beam from a focal volume is received back by scanning mirror 34, and the beam path is reversed, being onto primary mirror 26, then onto secondary mirror 32. From secondary mirror 32 it passes back through quarter wave plate 22, which changes the polarization from lefthand circular (changed from right hand to left hand as a result of reflection) to vertical polarization. From quarter wave plate 22 the beam passes onto 45° mirror 20 and is reflected onto Brewster window 18. Since the beam is vertically polarized, Brewster window 18 reflects the beam onto 45° mirror 38 which directs the beam onto focusing lens 40, which focuses the returned beam together with a reference beam to detector 36.

The reference beam is derived from Bragg cell 16 which changes the wavelength of laser 10 by increasing it by 24 MHz to thereby provide a local oscillator beam at a frequency different from that of the transmitted beam so that the sense of direction of the doppler shift from the target may be determined. Thus, there is no duplicate of signals for plus and minus velocities, which there would be otherwise if the local oscillator frequency were of the same frequency as laser 10. As discussed above, Bragg cell 16 is supplied a small portion of the output of laser 10 (about 10%). The output of Bragg cell 16 is turned 90° by 45° mirror 42 and directed through half wave plate 44, which shifts polarization to vertical (normal to plane of sheet of drawing) polarization. The beam then passes through beam splitter 38 to focusing lens 40, which focuses the beam onto photodetector 36 coincident with its focusing thereon of the return back scatter beam as previously described. Photodetector 36 is typically a HgCdTe photovoltaic cell and produces an electrical signal of a frequency equal to the difference in wavelength or frequency between the two beams.

Figure 2:
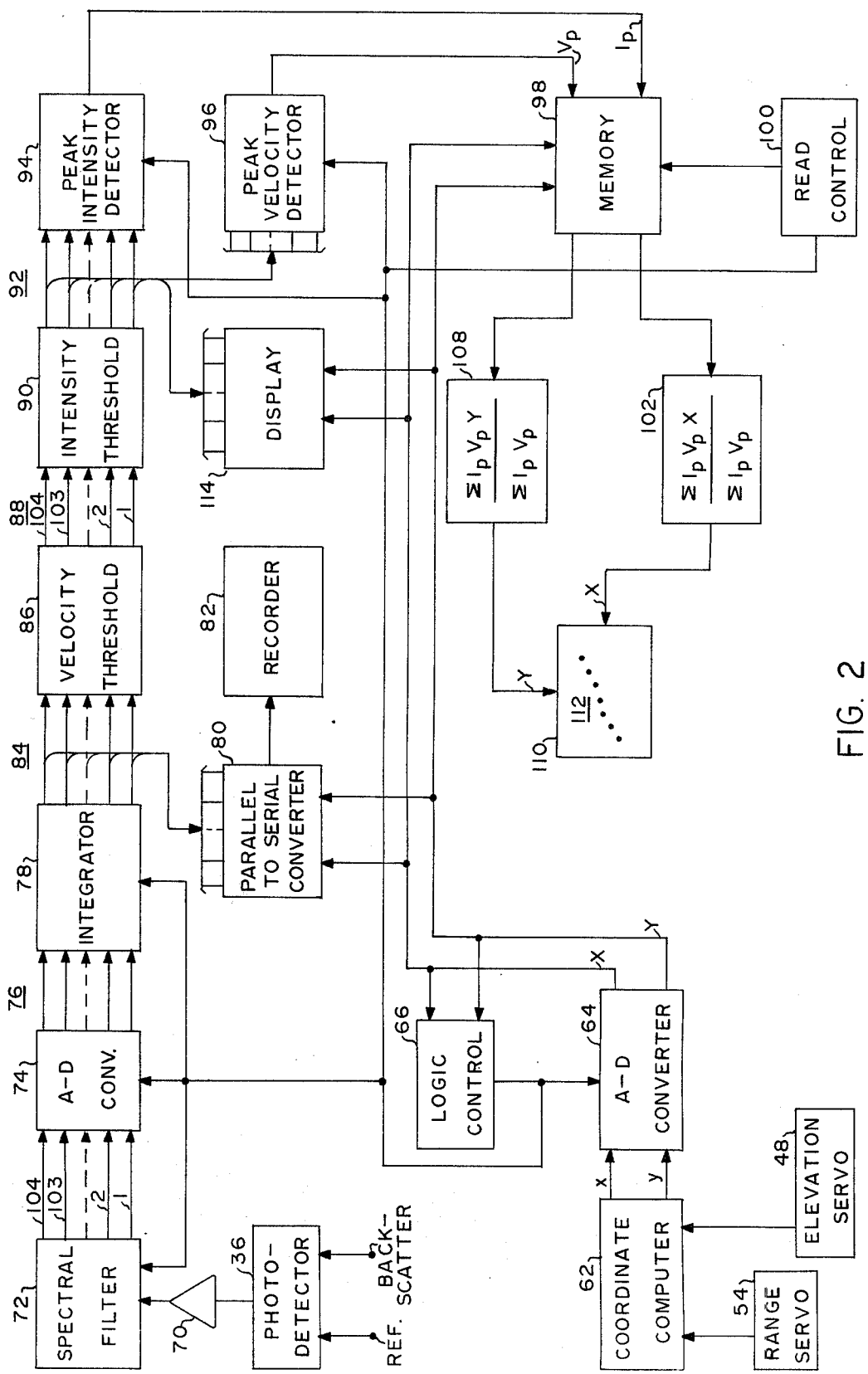
FIG. 2 is a block diagram of the electronic system of this invention.

The vertical angle $\theta$ of telescope 28, as housed in trailer 46 (FIG. 3), is scanned by means of servo motor 48 (FIG. 2) operating scanning mirror 34 about axis 50. Azimuth may be adjusted by rotation of mirror 34 about axis 52. The range at which telescope 28 is focused is scanned by servo motor 54, which is coupled to secondary mirror 32 and includes means for moving secondary mirror 32 along axis 56 in the directions indicated by arrow 58 through about ¼ inch of travel. Servos 48 and 54 are in turn controlled by elevation and range control 60 to effect an overall desired rate of scanning and relative rates of scanning as between elevation and range. As an example, scanning of elevation between an elevation angle of 3° and 59° would be effected in 2½ seconds, or a rate of 0.2 Hertz. During the 2½ seconds period, range would be scanned between 200 feet to 800 feet 35 times, or at a rate of 7 Hertz.

Figure 3:
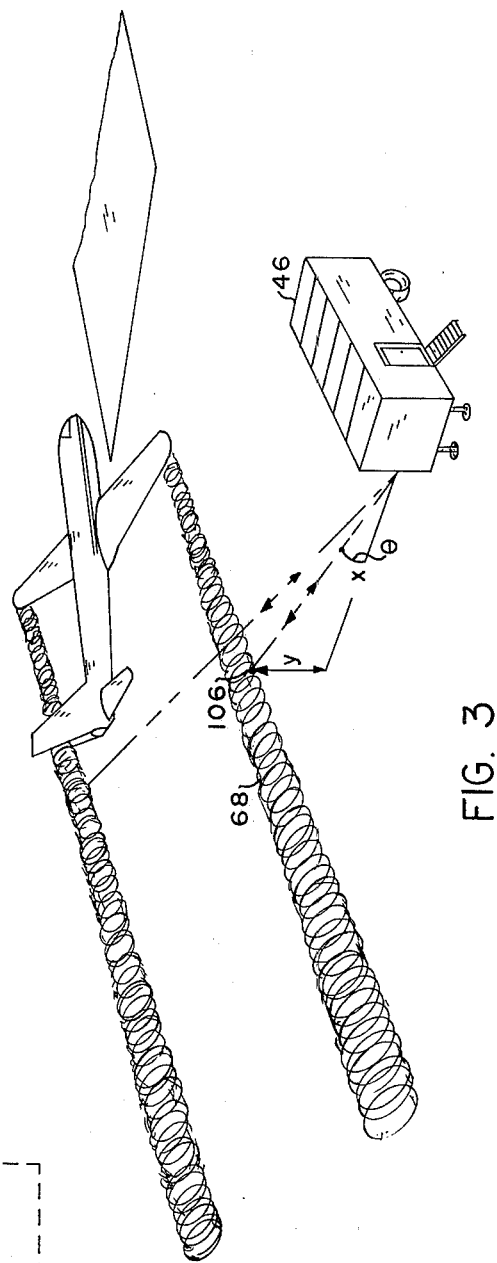
FIG. 3 is a pictorial view illustrating the operation of this invention in the measurement of vortices produced by an aircraft.

Elevation servo 48 would typically include means for providing the elevation angle $\theta$ to coordinate computer 62, and range servo 54 would provide slant range R to coordinate computer 62. Coordinate computer 62 would then provide as an output computed values for horizontal distance $x$ and vertical distance $y$ to the point in space, focal volume, upon which telescope 28 is focused. As shown in FIG. 3, these distances are referenced to the edge of the trailer housing telescope 28. These rectangular coordinates, $x$ and $y$, are then sampled and converted to digital form by A-D converter 64 (FIG. 2) at a selected sampling rate for the system, e.g., 1,250 times in an elevation scan (up or down) of 2½ seconds. Rate control is effected by master logic timing control 66 which contains a clock oscillator, frequency dividers, and counters to achieve overall time control in the system. The digitized X and Y coordinate outputs of A-D converter 64 are provided as coordinate location information to various subsystems of the system, as will be further discussed.

With laser 10 and telescope 28 in operation, upon the receipt of back scatter from a focal volume, such as one from within a vortex of turbulence 68 as shown in FIG. 3, detector 36 will provide output signals representative of air velocities within the described focal volume. These signals are amplified in amplifier 70 and applied to spectral analyzer or filter 72. The spectral filter employed here is of a saw filter type and is controlled by logic control 66 to scan the spectrum over a range of 100 KHz to 10.4 MHz, representative of 1.8 to 187.2 feet per second of velocity. As an example, a scan would be effected once each 31.25 microseconds, with velocity signals varying as a time ordered sequence during this period. 104 of them are picked off timed spaced sampling by A-D converter 74, and for purposes of illustration, 104 lines are identified as interconnecting filter 72 and A-D converter 74. At the 31.25 microseconds period for each scan, there would be achieved 64 such scans in two milliseconds. The frequency or velocity channels are labelled 1–104, with channel 1 being representative of 100 KHz, and thus 1.8 feet per second; channel 2 being representative of 200 KHz, or 3.6 feet per second; and so on; with channel 103 being representative of 185.4 feet per second; and channel 104 being representative of 187.2 feet per second. In this manner, a velocity sensitivity of 1.8 feet per second is achieved over a range of velocities from 1.8 feet per second to 187.2 feet per second. Where appropriate, lead lines interconnecting subsystems of the system carry these channel designations.

A-D converter 74 samples and obtains 104 samples during the 31.25 microseconds scan of filter 72 by digitized velocity outputs on channel lines 76 corresponding to the velocity designations for these lines as stated above. These outputs are supplied to integrator 78 which has an integration channel for each input channel, and responsive to timing signals from control logic 66, integrator 78 would perform integration on each channel by averaging 64 samples, this occurring in 2 milliseconds. In this fashion, integrator 78 provides a new integrated output of all channel lines 76 every 2 milliseconds, and thus providing 1,250 such outputs during an elevation scan of 2½ seconds. The spacing of the coordinate outputs X and Y from A-D converter 64 is identical, and thus there is provided from A-D converter 64 a coordinate output each 2 milliseconds which corresponds to the location of the focal volume from which the data outputs from integrator 78 are derived.

X and Y outputs of A-D converter 64 and integrator 78 are fed to parallel-to-serial converter 80 which places in sequential, or serial form, the outputs of integrator 78, with a set of data for a partical focal volume being preceded or followed by an encoded value of X and Y to identify the location of that focal volume. The thus arranged output of parallel-to-serial converter 80 is recorded in recorder 82.

The output channels 84 of integrator 78 are also connected to the input of velocity threshold control 86 which contains conventional on/off control gates in each channel, whereby only channels containing signals above a frequency corresponding to a minimum velocity are gated through. In this fashion, a selected range of velocities of interest may be chosen for further analysis. To further selectively restrict data for observation, output channel lines 88 of velocity threshold control 86 are coupled as inputs to intensity threshold control 90, which comprises conventional amplitude responsive gates in each channel, these gates being adjustable as to the minimum level they will pass. Thus, at the output of threshold 90, on output channels 92, there will be present only signals which are of a minimum velocity, and of these, only signals having an intensity greater than a selected value. One set of these channel lines is fed to peak intensity detector 94, which compares all of the intensities of the signals present and provides as an output the signal having the highest intensity, or $I_P$.

A second set of output channels is connected as an input to peak velocity detector 96, a comparator which provides as an output a number proportional to the highest velocity present, or $V_P$.

Under the control of logic control 66, memory 98 receives values of $I_P V_P$ for each discrete focal volume scanned, together with the coordinate location or identification of the focal volumes, memory 98 storing a complete set of data for one complete scan in elevation at the end of each scan and under the control of logic control 66. Read control 100 controls memory 98 to search memory 98 for the highest reading of $I_P$ during that scan; and upon locating it and identifying its X and Y coordinates, read control 100 then causes memory 98 to scan and read out data for X-Y located focal volumes which are within a selected radius, for example, 30 feet from the location of the one in which a maximum $I_P$ has been detected. X coordinate detector 102 is then fed sets of $I_P$, $V_P$, and X for each such coordinate location. As labelled, X coordinate detector 102 then averages the products of the sets of $I_P$, $V_P$, and X values. In a like manner, the $I_P$ and $V_P$ products are averaged for the same location, and the indicated division of $\epsilon I_P V_P X$ by $\epsilon I_P V_P$ summation is performed. This provides $X_C$, the X coordinate for the centroid of the turbulence region 106 illustrated by vortex 68 in FIG. 3. In a like manner, Y coordinate detector 108 would perform the indicated operations shown for it and the $Y_C$ coordinate for the centroid determined. These coordinates are then applied to track display 110, which indicates as a dot a plotted position for the centroid of turbulence, showing both its elevation and range. The series of dots 112 shown indicate successive positions in time of the centroid of turbulence, thus enabling it to be tracked as it moves, which is typically the case.

While the description thus far has dealt with the location of a single vortex or centroid of turbulence, where there is a possibility that two may be present, as illustrated in FIG. 3, read control 100 would be additionally programmed to locate a second center of maximum turbulence. This would be accomplished by a program wherein memory 98 is scanned to search for the maximum value of $I_P$ outside of the originally located radius of examination and which is at least a minimum percentage of the maximum value $I_P$ originally detected. For example, it might be selected as a value of 80%. When such is located, then memory 98 would be scanned for data recorded from an area defined by radius about the focal volume with the newly located $I_P$. Then the process of readout and computation with respect to the second area of turbulence would be effected in the same fashion, and it would be displayed by conventional dual scan techniques on display 110 or on a second display.

Actual velocities and intensities of the velocities for each focal volume scanned may be selectively read out from integrator 78 or from a recording obtained by recorder 82. Additionally, the number of velocities exceeding threshold velocity at any instance may be obtained from velocity threshold 86. Further, the number of signals which satisfy both the velocity threshold and intensity threshold may be obtained as an output of intensity threshold 90, as by means of a counting circuit which would count the lines satisfying the threshold levels. As a means of further readout, display 114 is shown as receiving outputs from intensity threshold 90 and coordinates from A-D converter 64. In form, it may simply be an oscilliscope-type display similar to that of display 110. Switching means would be included to select for viewing an output from one or more selected channels.

What is claimed is:
1. A velocimeter for remotely measuring the velocity of a region in space, a focal volume, comprising:
   a source of radiation of a wavelength of 3 to 12 microns;
   a telescope including a viewed port, a viewing port, training means for directing the field of view of said viewing port onto a discrete focal volume in space, and range adjustment means for varying the focus of said telescope;
   photodetection means responsive to radiation of different wavelengths for providing an electrical output of a frequency representative of the difference of said wavelengths;
   interferometer means comprising:
      first coupling means for coupling a major portion of the output of said source of radiation to said viewed port of said telescope,
      second coupling means for coupling radiation reflected from a said focal volume to said viewing port and through said telescope to said detection means, and
      means responsive to a minor portion of the radiation from said source of radiation for providing a reference wavelength to said photodetection means;

range scanning means coupled to said range adjustment means for cyclically varying the range of said telescope, whereby radiation is directed onto a particularly distant focal volume in space; and indicating means responsive to said range scanning means and said photodetection means for indicating the distance of a focal volume upon which said telescope is focused and the velocities of air within said focal volume.

2. A velocimeter as set forth in claim 1 wherein said training means of said telescope comprises elevation scanning means for varying the angle of viewing in elevation of said telescope between selected lower and upper limits, and wherein said indicating means includes coordinate computation means responsive to said elevation scanning means and said range scanning means for indicating, in rectangular coordinates, X, horizontal distance, and Y, height, of the location of each focal volume upon which said telescope is focused.

3. A velocimeter as set forth in claim 2 wherein said indicating means further comprises filter means responsive to the output of said photodetection means for providing as discrete outputs signals representative of discrete wavelengths detected by said photodetection means.

4. A velocimeter as set forth in claim 3 further comprising peak detection means responsive to the output of said filter means for providing as a first output a signal representative of the highest, peak, velocity signal present and for providng as a second output a signal proportional to the highest, peak, intensity signal present for each said focal volume scanned.

5. A velocimeter as set forth in claim 4 further comprising:

memory means responsive to said peak detection means and said coordinate computation means for storing, as a set of data, the X-Y coordinate location, peak intensity, and peak velocity for each focal volume scanned over at least one elevation scanning between said lower and upper elevation limits; and read control means coupled to said memory means for supplying as outputs from said memory means sets of data for focal volumes corresponding to those focal volumes identified by coordinates as being within a selected distance from the focal volume providing the highest value of peak intensity.

6. A velocimeter as set forth in claim 5 wherein:

said interferometer means comprises:

said first coupling means comprises, in series between said source of radiation and said viewed port of said telescope, in this order, a beam splitter, a Brewster window, and a quarter wave plate, said beam splitter being oriented to reflect, and said Brewster window being oriented to transmit said major portion of the output of said source of radiation, and said second coupling means comprises said quarter wave plate, said Brewster window, and a second beam splitter, said Brewster window and second beam splitter being oriented to reflect radiation, derived from reflected radiation from said focal volume, to said detection means; and said means for providing a reference wavelength to said photodetection means comprising said first-named beam splitter, a half wave plate, and a second beam splitter, said beam splitters being oriented to pass radiation from said source of radiation.

7. A velocimeter as set forth in claim 6 wherein said means for providing a reference wavelength to said photodetection means includes a Bragg cell interpositioned between said first-named beam splitter and said second beam splitter.

8. A velocimeter as set forth in claim 7 wherein said telescope is a cassegranian telescope comprising:

a primary mirror, and said viewed port is a central opening in said primary mirror;

a secondary mirror coaxially positioned with respect to said primary mirror along a central axis of said telescope and facing said viewed port, whereby radiation entering said viewed port through said central opening in said primary mirror strikes said secondary mirror and is reflected onto said primary mirror; and said range scanning means comprises means for relatively moving said secondary mirror along said central axis of said telescope.

9. A velocimeter as set forth in claim 8 wherein said means for varying the angle of viewing in elevation comprises a scanning mirror positioned to intercept radiation between said primary mirror of said telescope and a viewed focal volume in space, and means coupled to said scanning mirror for rotating said scanning mirror about an axis corresponding to said central axis of said telescope.

10. A velocimeter as set forth in claim 9 wherein said training means further comprises means for rotating said scanning mirror about an axis perpendicular to said central axis, whereby said field of view may be scanned in azimuth.

* * * * *